United States Patent
Boscolo et al.

(10) Patent No.: US 6,949,906 B2
(45) Date of Patent: Sep. 27, 2005

(54) DRIVING CIRCUIT AND METHOD FOR PREVENTING VOLTAGE SURGES ON SUPPLY LINES WHILE DRIVING A DC MOTOR

(75) Inventors: Michele Boscolo, Sottomarina (IT); Marco Viti, Cornaredo (IT); Ezio Galbiati, Agnadello (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 219 days.

(21) Appl. No.: 10/147,347

(22) Filed: May 16, 2002

(65) Prior Publication Data

US 2003/0007375 A1 Jan. 9, 2003

(30) Foreign Application Priority Data

May 17, 2001 (EP) ............................................. 01830313
Sep. 12, 2001 (EP) ............................................. 01203450

(51) Int. Cl.$^7$ ............................................. G05B 11/28
(52) U.S. Cl. ...................................... 318/599; 318/530
(58) Field of Search ...................... 363/71, 132, 56.05, 363/37, 41; 318/493, 251, 249, 252, 375, 379, 362, 530, 599, 696

(56) References Cited

U.S. PATENT DOCUMENTS 4,922,161 A * 5/1990 Gilliland et al. ............ 318/269
4,967,336 A * 10/1990 Davies et al. ............... 363/132
5,446,354 A * 8/1995 Hiruma ....................... 318/439
5,483,615 A * 1/1996 Hallidy ....................... 388/803
5,612,599 A * 3/1997 Itami et al. ................. 318/254
6,351,399 B2 * 2/2002 Takanashi et al. ....... 363/56.05
6,373,207 B1 * 4/2002 Yablonovitch .............. 318/362

FOREIGN PATENT DOCUMENTS

JP         10 098893 A   *   4/1998

OTHER PUBLICATIONS

Patent Abstracts of Japan, vol. 1998, No. 9, Jul. 31, 1998, JP 10 098893A (Ricoh Co. Ltd), Apr. 14, 1998.
Patent Abstracts of Japan, vol. 1995, No. 6, Jul. 31, 1995, JP 07 087782A (Toshiba Corp.), Mar. 31, 1995.
Patent Abstracts of Japan, vol. 1996, No. 12, Dec. 26, 1996, JP 08 205576A (Fujitsu General Ltd.), Aug. 9, 1996.

* cited by examiner

Primary Examiner—Rajnikant B. Patel
(74) Attorney, Agent, or Firm—Lisa K. Jorgenson; Allen, Dyer, Doppelt, Milbrath & Gilchrist, P.A.

(57) ABSTRACT

A driving circuit of a DC motor includes a control circuit for providing a control signal, and a motor drive circuit commanded by the control circuit for providing respective command signals for the switches of an output power stage connected to the DC motor. The output power stage is connected to a power supply line and drives the windings of the DC motor. The driving circuit prevents generation of voltage surges having a significant magnitude on the power supply line because the driving circuit has logic circuits for preventing any substantial inversion in the direction of current flow in the supply lines when the DC motor operates as a current generator.

28 Claims, 11 Drawing Sheets

DRIVING CIRCUIT AND METHOD FOR PREVENTING VOLTAGE SURGES ON SUPPLY LINES WHILE DRIVING A DC MOTOR

FIELD OF THE INVENTION

The present invention relates in general to DC motors, and more particularly, to a driving circuit and a method for preventing voltage surges on the supply lines of a DC motor.

BACKGROUND OF THE INVENTION

DC motors are used in a variety of applications. Several methods for varying the speed of the rotor are known, whether the motor has brushes or is a so-called brushless motor.

The speed of brushless motors may be varied by varying the supply voltage of the windings of the stator, for example, by reducing with a rheostat the voltage applied to the terminals of the motor. A motor may also be driven in a switching mode, that is, by coupling the motor terminals alternately to the supply rail and ground potential. This is normally done by using a half bridge stage formed by a pair of switches, commonly MOS transistors of opposite conductivity, driven in phase opposition. The effective voltage applied to the motor terminals is determined by the ratio between the duration of the phase in which the terminal is coupled to the supply voltage, and the duration of the phase in which it is grounded, according to a PWM mode.

A brushless motor has a permanent magnet rotor and a stator with a certain number of windings (most commonly three) that may be customarily connected in a star or a polygonal (triangle or delta) configuration. The motor is driven by coupling its windings to a supply node and to a ground potential according to a cycle (phase) excitation sequence.

In addition to the conventional star or polygonal configurations, the windings may alternatively be configured according to a so-called independent phases configuration, where both terminals of each phase winding are connectable to respective external driving circuits and driven independently from the other phase windings.

As it is well known, the revolution of the rotor induces a back electromotive force in the windings of electrical motors. Such a back electromotive force BEMF, under particular operating conditions, may cause voltage surges, i.e., relatively large overvoltages, on the supply rails. For example, such a condition is reached when a voltage smaller than the back electromotive force is applied to the spinning rotor for reducing its rotation speed.

A driving voltage that is obviously greater than the back electromotive force induced on the windings of the motor by the rotation of the rotor is normally applied to the windings of the motor for forcing a certain current through the phase windings of the motor, and therefore, produce a torque. When the voltage is lowered, the back electromotive force may become greater than the applied voltage and cause a voltage surge on the supply lines.

These voltage surges may disturb, sometimes in an unacceptable manner, the functioning of electronic circuits coupled to the same supply lines of the motor. According to well known techniques, a capacitor may be connected between the supply rail and the ground node for filtering the switching noise on the supply line, and if sufficiently large, also for limiting the amplitude of voltage surge peaks. Since these capacitors cannot be made as large as would be desirable because of cost and other factors, they are commonly provided with a Zener diode in parallel. When the voltage on the capacitor exceeds a certain value, the Zener diode turns on, thus discharging the capacitor.

This known approach does not satisfactorily eliminate cost and has other drawbacks. The Zener diode must necessarily be a power diode capable of absorbing current peaks of several amps for discharging the capacitor in relatively short times. Moreover, this known technique may only limit the maximum amplitude of voltage surges that remain observable.

SUMMARY OF THE INVENTION

A method and corresponding circuit for driving a DC motor are provided that reduces or prevents generation of voltage surges, i.e., overvoltages of significant magnitude, on the supply lines.

It has been observed that under particular operating conditions the voltage on the supply line quickly increases when the direction of the current inverts itself. Such an inversion takes place whenever the DC motor, which is a reversible machine, starts to operate as a current generator.

In running a DC motor there may be phases, alternated to phases of conventional functioning, in which the motor becomes an electrical energy source, functioning as a current generator and thus forcing a reverse current on the supply lines. Obviously, upon passing from a normal drive condition of the motor to this other condition, the direction of the current on the lines to the motor windings inverts itself. This inversion may cause voltage surges on the power supply rails. To prevent the generation of voltage surges, the method of the invention practically eliminates any substantial or deep inversion of the direction of flow of the current on the lines that supply the motor windings.

According to the method of the invention, the occurrence of operating conditions that potentially could lead to a significant voltage surge because of an inversion of the current direction is constantly monitored, and whenever a critical condition is detected, the driving of the motor is automatically modified. Alternately, the windings of the motor may be short-circuited or set in a high impedance state (tristate).

According to the method of the invention, operating conditions alerting an inversion of the direction of current having a significant magnitude may be detected by carrying out at least one of the following tests: monitoring and comparing the value of the voltage on the supply lines; monitoring and comparing the voltage on at least a winding of the motor; monitoring and comparing the direction of flow of the current on the supply lines; or monitoring and comparing the phase difference between the current circulating in at least a winding and the back electromotive force induced on the same winding.

If any of these tests establishes that the detected quantity reaches or surpasses a respective threshold, a warning that the operating conditions of the motor may lead to the generation of voltage surges is generated. In such a case, the method of the invention may either: temporarily short-circuit or set in a high impedance state the windings of the motor; or modify the driving signal that is normally produced by a control circuit that regulates the functioning of the motor.

A further object of the present invention is to provide a system for driving a DC motor, comprising a control circuit producing a control signal, a motor drive circuit commanded by the control circuit producing command signals for the switches of an output power stage driving the windings, in parallel to a filter capacitor.

A characterizing feature of the circuit of the invention is that it comprises logic circuits for preventing any substantial inversion of the direction of flow of the current in the supply lines whenever the motor operates as a current generator. Preferably, the circuit of the invention further comprises a circuit monitoring at least one operating condition that may cause voltage surges, and a regulating circuit.

The circuit has an output coupled to the logic circuits, and an input receiving a signal representative of at least one of the operating parameters belonging to the group of: the voltage on the supply node of the output power stage; the voltage present on at least a winding of the motor; the direction of flow of the current on the supply lines; and the phase difference between the current circulating in at least a winding of the motor and the back electromotive force induced on the same winding. The selected representative signal is compared with a certain threshold and a warning signal is produced when the threshold is exceeded. The regulating circuit prevents the generation of voltage surges on the supply node of the output power stage of the motor by producing a modified control signal. This signal is input to the motor drive circuit as a function of the control signal and of the warning signal.

BRIEF DESCRIPTION OF THE DRAWINGS

The different aspects and advantages of the present invention will become more evident through a detailed description of several embodiments, and by referring to the attached drawings, wherein.

DETAILED DESCRIPTION OF THE PREFERRED EMBODIMENTS

To simplify illustration of the features of the invention in the following description, several embodiments of the invention will be treated, and all are related to brushless motors. However, the present invention is not limited to brushless motors, and other kinds of DC motors are readily applicable. In consideration that driving in a switching mode may be used with any kind of DC motor, and it is used in an increasingly large number of applications, the invention will be described for the particular case of driving a motor in a switching mode. However, the invention remains useful and may be implemented in a linear driving system with the necessary changes having been made.

In the most common case of star or triangle configured motors with three phase windings, the windings may be driven by integrated circuits. The power output stage that drives the phase windings generally comprises a three-phase bridge circuit composed of six BJT or MOS transistors.

Figure 1:
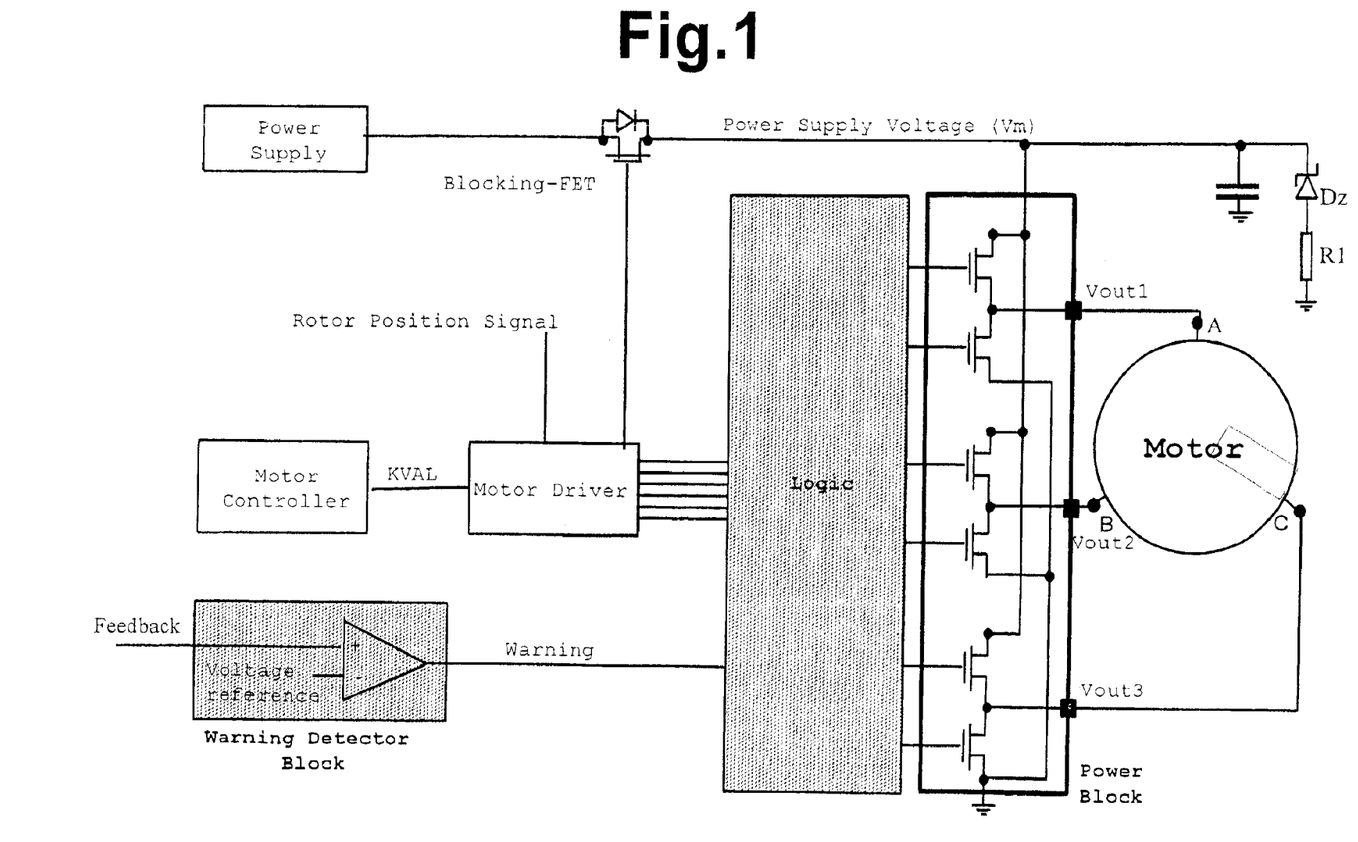
FIG. 1 is a basic diagram of a circuit according to the present invention comprising a voltage comparator producing a logic warning signal when either the supply voltage, the voltage on at least a winding or the phase difference between the current circulating in a winding of the motor and the back electromotive force induced in the same winding exceeds a respective pre-established value, and temporarily short-circuiting or setting in a high impedance state (tristate) the windings of the motor.

A basic diagram of a driving circuit of a three-phase brushless motor embodying this invention is depicted in FIG. 1. It includes a control circuit MOTOR CONTROLLER producing a control signal KVAL, a motor drive circuit MOTOR DRIVER commanded by the control circuit MOTOR CONTROLLER for producing respective command signals for the power switches of an output power stage POWER BLOCK connected to a power supply line.

The circuit of FIG. 1 is different from prior art driving circuits by having an additional logic interface circuit LOGIC for controlling the power stage. The power stage prevents any substantial inversion of direction of flow of the current in the supply line. Whenever the motor operates as a current generator, the logic circuit LOGIC prevents the generation of voltage surges by short-circuiting the windings of the motor to ground or to the supply line, or by setting them in a high impedance state by turning off all switches of the power stage.

Operating conditions that may cause an inversion of the flow of the current in the supply line are detected by the circuit WARNING DETECTOR BLOCK. This circuit is input with a signal FEEDBACK representative of a certain operating parameter of the driving circuit, and produces a signal WARNING when the monitored operating parameter exceeds a certain value.

The signal FEEDBACK is representative of at least one of the following operating parameters: the voltage VM on the supply node of the output power stage of the motor POWER BLOCK; the voltage on at least a winding of the motor; the direction of flow of the current on the supply lines of the output power stage POWER BLOCK; and the phase difference between the current circulating in at least a winding of the motor and the back electromotive force BEMF induced on the same winding.

Even monitoring such a phase difference has been found to provide for a reliable parameter for preventing a significant current inversion. It has been found that the current on the supply lines inverts whenever the phase difference between the current circulating through the windings and the back electromotive force BEMF induced thereon exceeds a certain value.

Commonly, the control circuit MOTOR CONTROLLER produces a control signal KVAL that determines the duty cycle of the power switches of the output stage POWER BLOCK. The drive circuit MOTOR DRIVER drives the power switches of the output stage as a function of the control signal KVAL and of a synchronization signal ROTOR POSITION SIGNAL that indicates the position of the rotor with respect to the phase windings of the motor. This generated signal ROTOR POSITION SIGNAL is necessary for a brushless motor. If the motor is a motor with brushes, this signal may not be necessary.

A filter capacitor is customarily connected between the supply rail and ground for filtering the noise on the supply line. The filter capacitor may be provided with a parallel discharge path for sinking a discharge current should voltage surges on the supply node of the output power stage occur. In absence of this discharging path, electrical charges would be sunk to ground only by way of leakage currents, but in view of the fact that the power devices of the output stage are normally designed to make leakage currents as small as possible, such a capacitor discharge path is normally recommended.

A suitable discharge path may be formed through an additional sinking switch that is turned on when the voltage VM on the supply node exceeds a maximum value, and a series resistor R1. A very straightforward discharge path may be that of FIG. 1, wherein the additional sinking switch is a Zener diode Dz. When the voltage VM on the supply lines exceeds a certain value, the Zener diode Dz turns on discharging the filter capacitor.

Alternatively, the discharge path may be realized by exploiting a switch that is turned on/off by the logic circuit according to the invention for preventing substantial inversions of the direction of the current. The logic circuit prevents voltage surges either by short-circuiting or by setting in a high impedance state the windings of the motor, and at the same time, it may also turn on the switch of the discharge path of the filter capacitor.

It is important to remark that contrary to the known driving circuits that need to use a power Zener or TRANSILL™ diode (or a power switch) for discharging as fast as possible the filter capacitor to limit the magnitude of voltage surges, in the driving circuit of this invention the function of the diode Dz of the circuit of FIG. 1 may be performed advantageously by a signal Zener diode. This is because large voltage surges on the supply line are effectively prevented by the logic circuit LOGIC.

Figure 2:
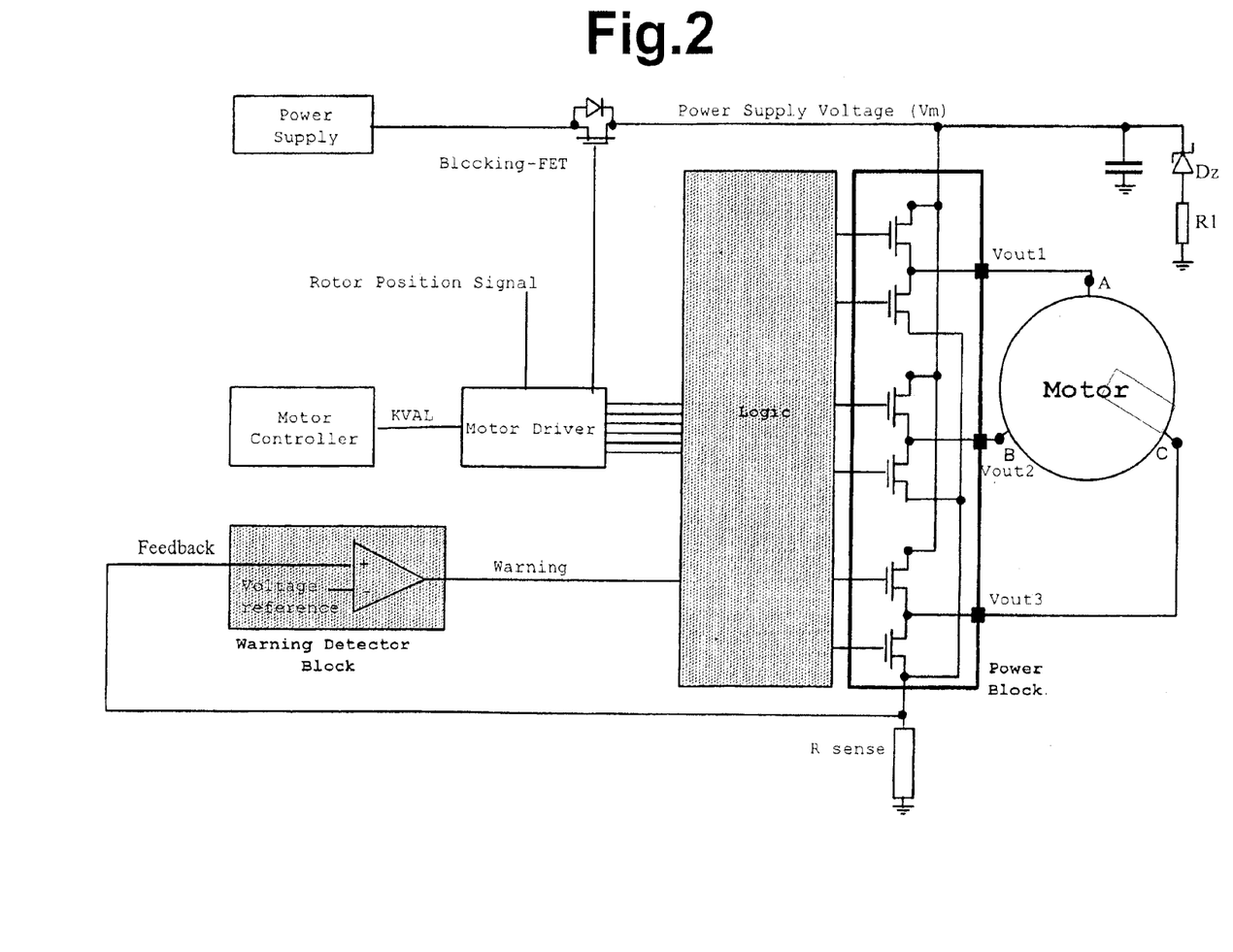
FIG. 2 is a basic diagram of a circuit according to another embodiment of the present invention, which monitors the direction of the current on the supply lines and temporarily short-circuits or sets in a high impedance state the windings of the motor.

A driving circuit of the invention, monitoring the direction of flow of the current circulating in the supply lines is depicted in FIG. 2. According to this embodiment, the signal FEEDBACK is the voltage drop on a sense resistor RSENSE coupling a common potential node of the output power stage POWER BLOCK to ground. The maximum reverse current that may be injected by the motor on the supply lines, upon surpassing which the signal WARNING is activated, may be pre-established by adjusting the threshold VOLTAGE_REFERENCE.

Figure 3A:
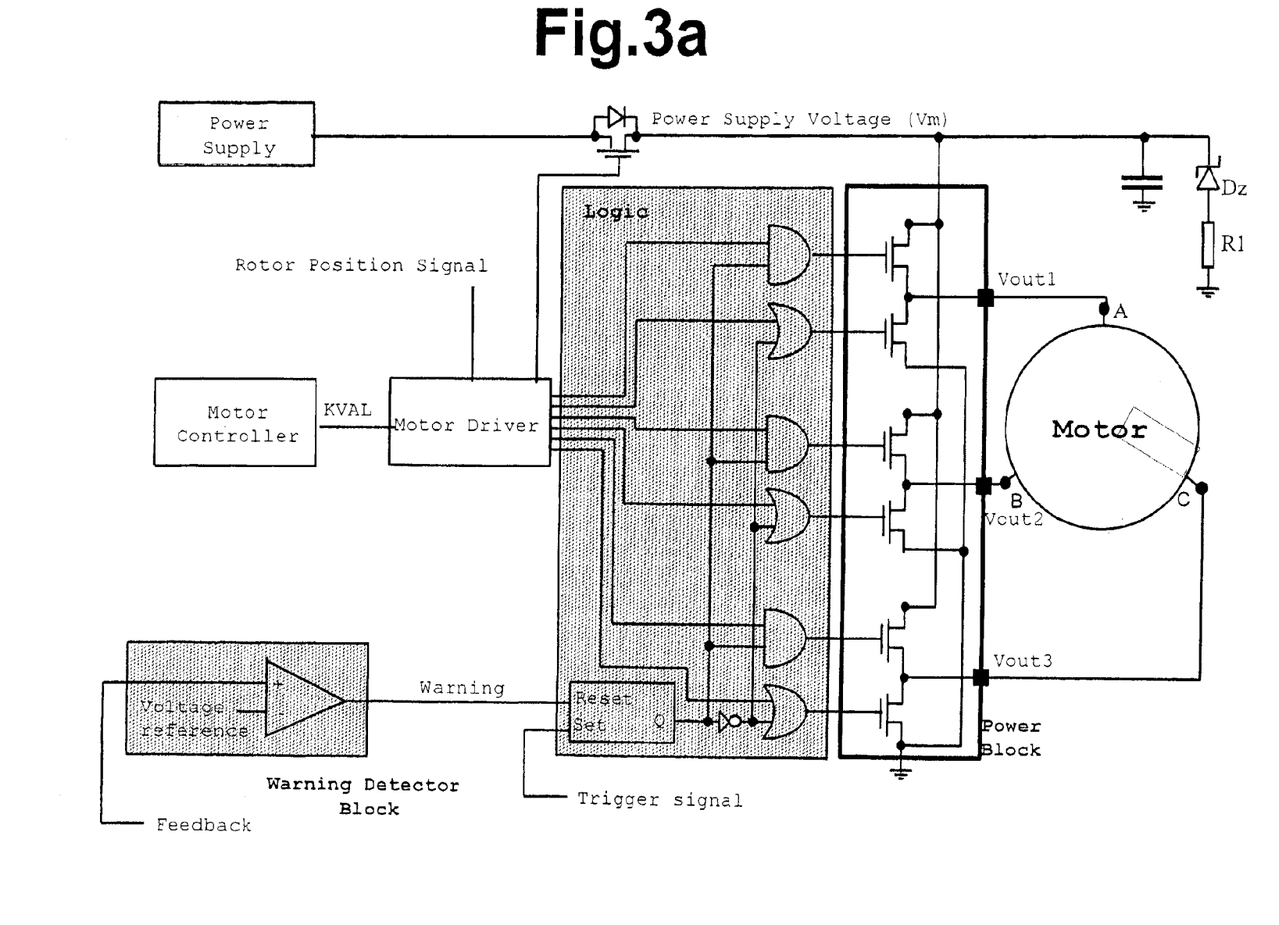
FIGS. 3a, 3b and 3c show alternative embodiments of the circuit illustrated in FIG. 1.
Figure 3B:
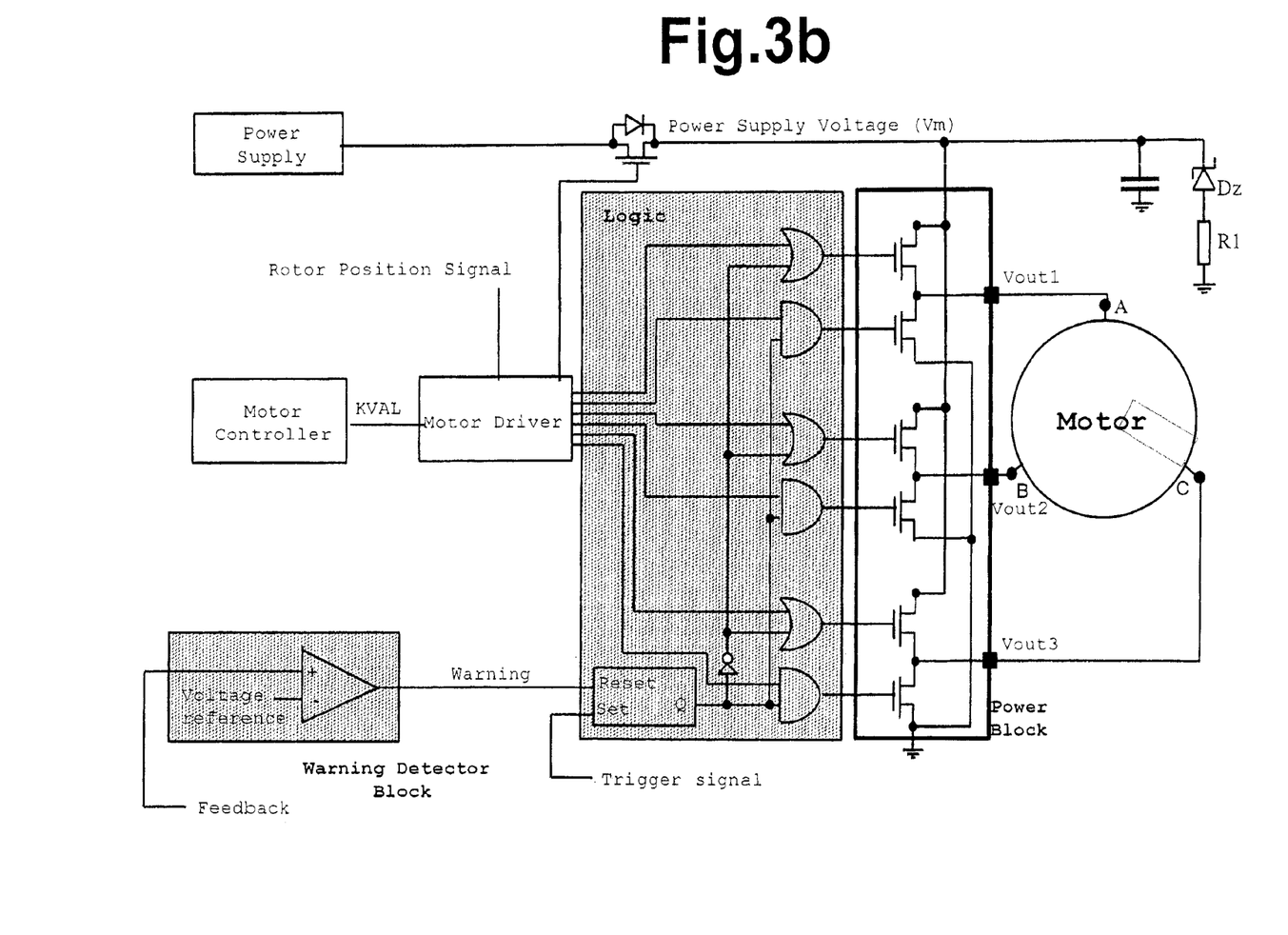
Figure 3C:
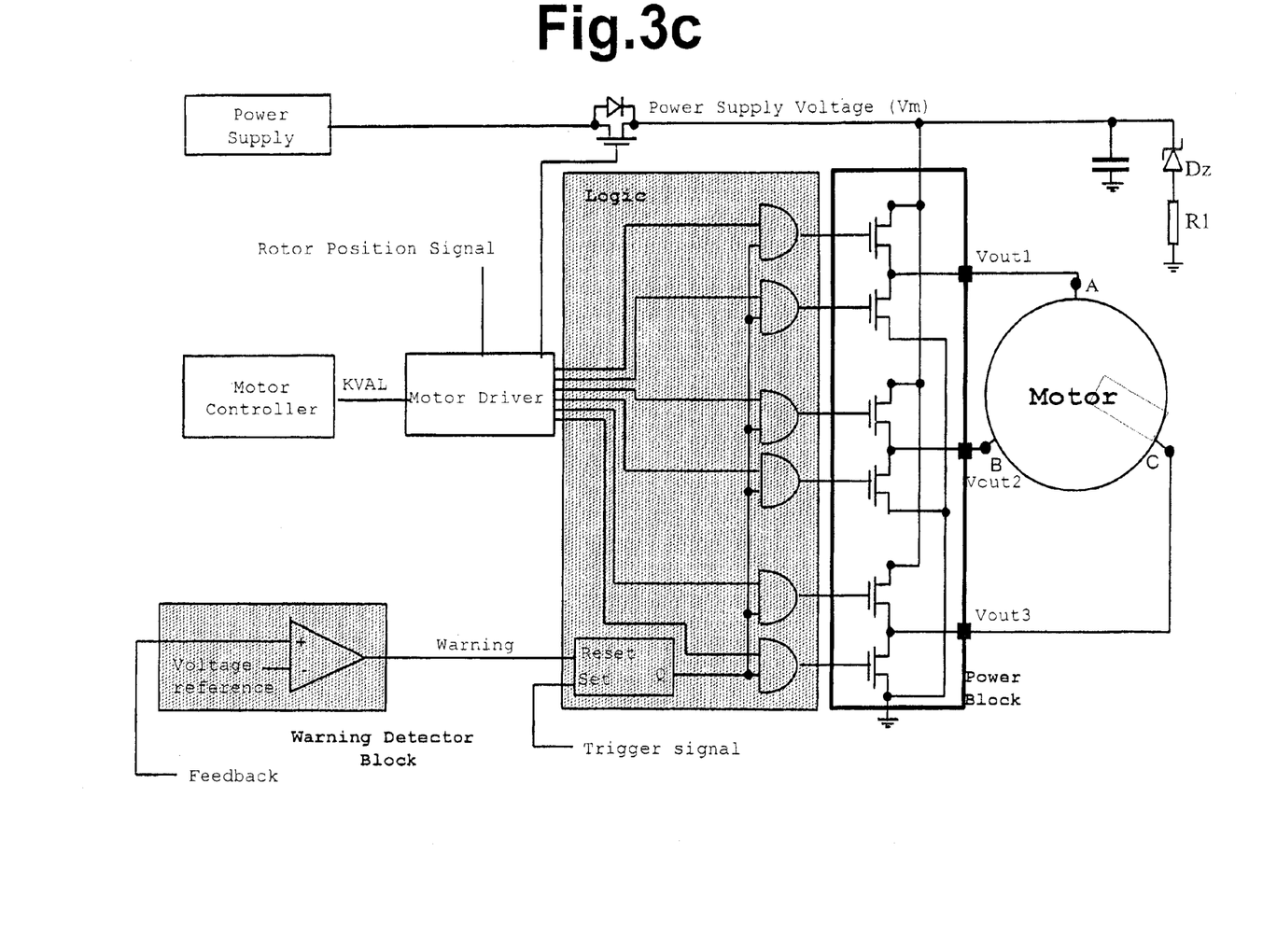

More detailed diagrams of three alternative embodiments of the circuit of FIG. 1, using a number of AND OR logic gates, are depicted in FIGS. 3a, 3b and 3c. The power switches that form the output power stage POWER BLOCK are turned on/off by a high/low logic signal applied on their control nodes. According to the schemes of FIGS. 3a and 3b, the circuit LOGIC becomes active whenever the signal WARNING becomes active, and short-circuits all the phase windings of the motor by connecting both ends of each winding to the same potential, either to ground or to the supply node of the output power stage, respectively.

According to the alternate embodiment of FIG. 3c, the logic circuit LOGIC sets in a high impedance state (tristate) the windings of the motor by turning off all the power switches of the output power stage when the signal WARNING is active. Should it become necessary to limit the frequency of intervention of the circuit LOGIC, all the logic gates may be input with an inverted replica of the signal WARNING that is purposely made to remain in the inactive state for a time duration equal or longer than a pre-established minimum value (stretching). In other words, the switchings from an inactive state back to an active state of this replica signal are deliberately delayed with respect to the corresponding switchings of the WARNING signal.

This inverted replica signal may be produced, as in the example depicted in FIGS. 3a, 3b and 3c by an SR flip-flop set by an internally generated timing signal TRIGGER SIGNAL, and reset by the WARNING signal. The timing signal may have a constant frequency or may be such to provide for a constant time of activation of the logic gates.

Figure 4:
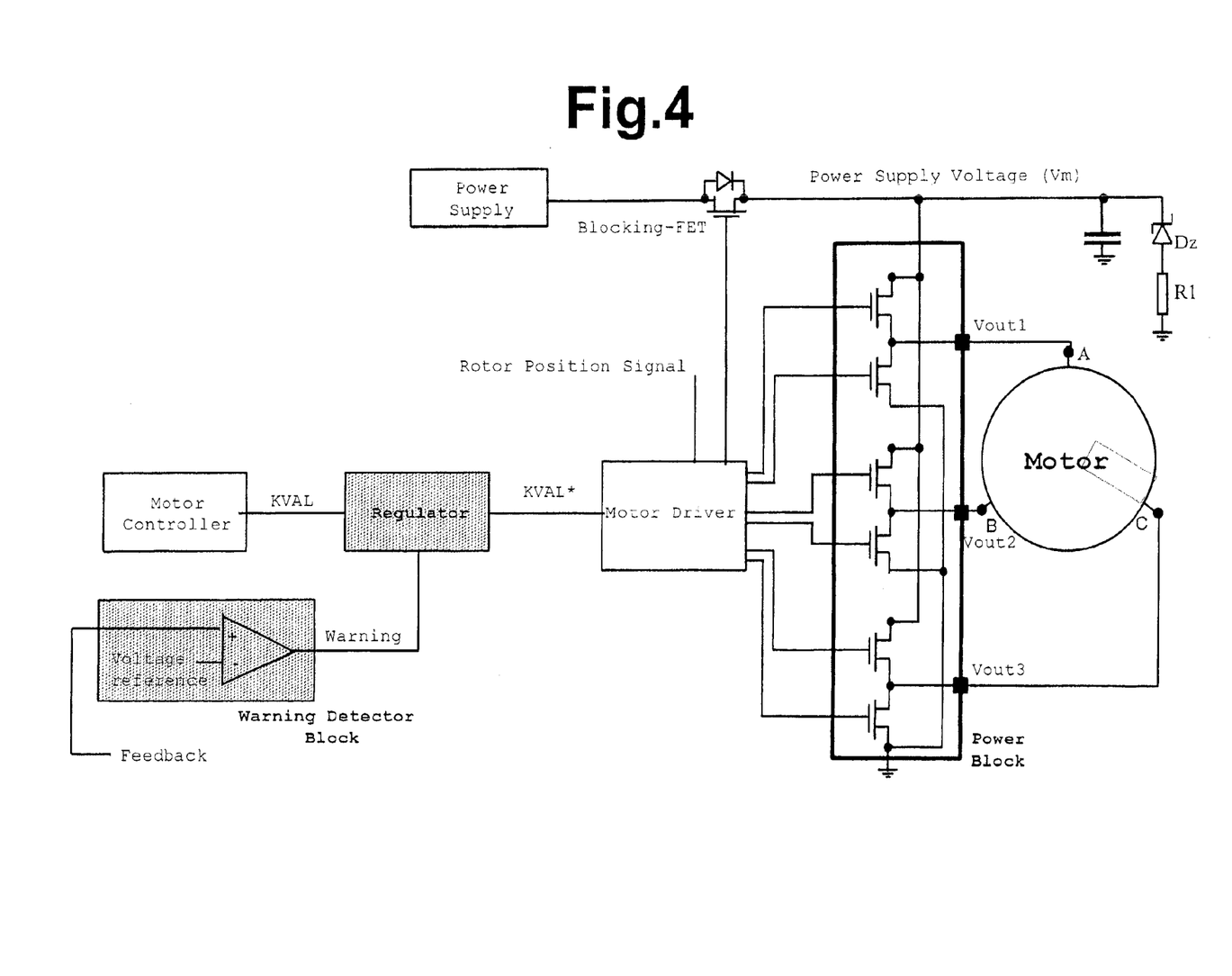
FIG. 4 is a basic diagram of a driving circuit according to another embodiment of the present invention comprising a regulating circuit that modifies the driving signal produced by a control circuit, and temporarily short-circuits or sets in a high impedance state the windings of the motor.

FIG. 4 shows another embodiment of the driving circuit of the present invention. In this case, the logic circuit that prevents any substantial inversion of the flow of the current on the supply lines is embodied in the regulating circuit block REGULATOR, functionally upstream of the motor drive circuit MOTOR DRIVER.

According to this alternate embodiment, the regulating circuit REGULATOR produces a modified control signal KVAL* that is input to the motor drive circuit, as a function of the control signal KVAL and of the signal WARNING. When the warning signal WARNING is inactive, the signal KVAL* is a replica of the control signal KVAL produced by the control circuit.

On the contrary, whenever at least one of the monitored parameters exceeds a respective threshold value, the signal WARNING becomes active and the modified control signal KVAL* is such to command the motor drive circuit MOTOR DRIVER to short-circuit or to set in a high impedance state the windings of the motor (irrespective of the control signal KVAL).

The signals KVAL and KVAL* may be either analog signals or digital signals, for instance data composed of a certain number of bits, as well as PWM signals. In the latter case, the regulating circuit REGULATOR may be realized in a very straightforward manner, as depicted in the two embodiments of FIGS. 5a and 5b.

Figure 5A:
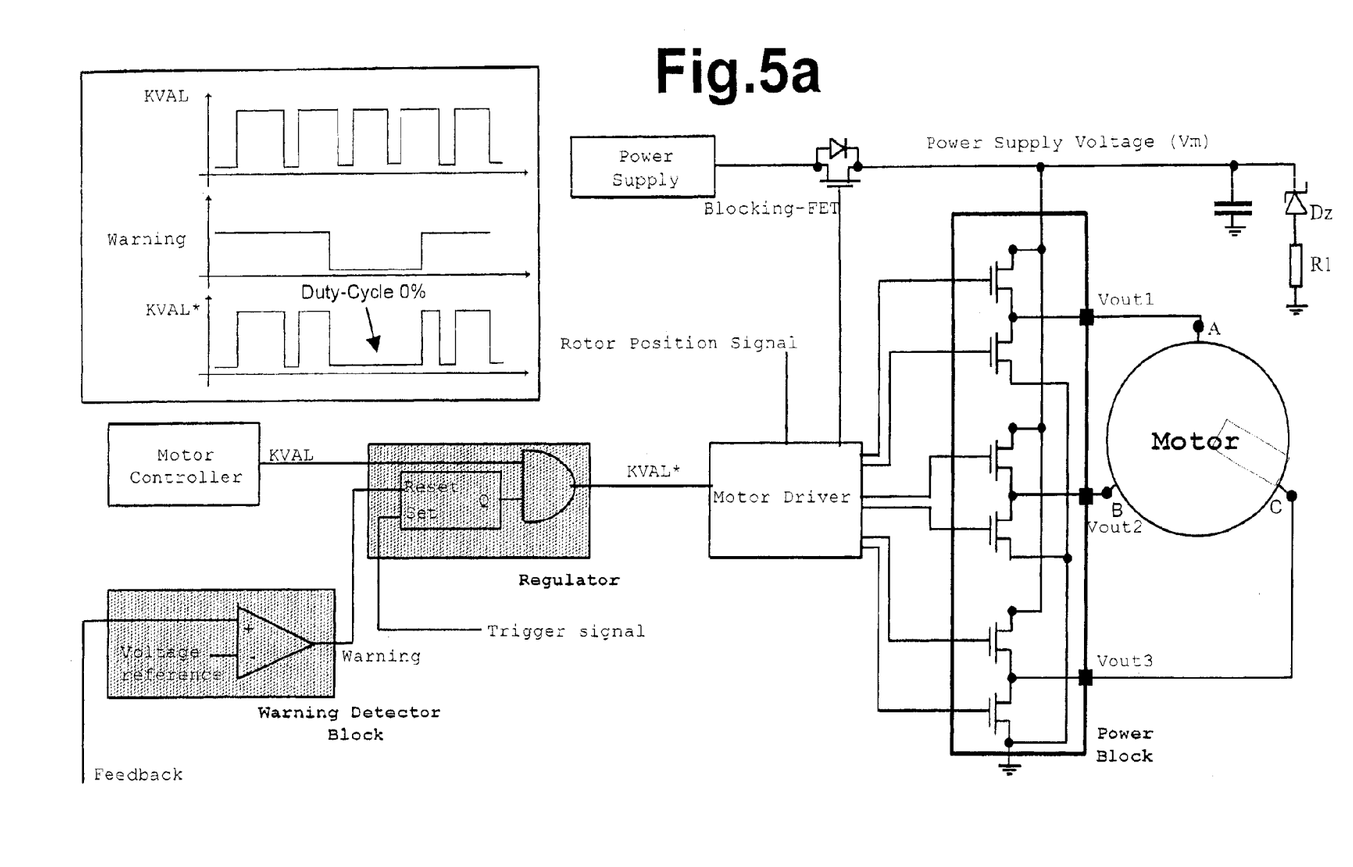
FIG. 5a is an embodiment of the circuit illustrated in FIG. 4 for driving the motor in a voltage mode using PWM signals.
Figure 5B:
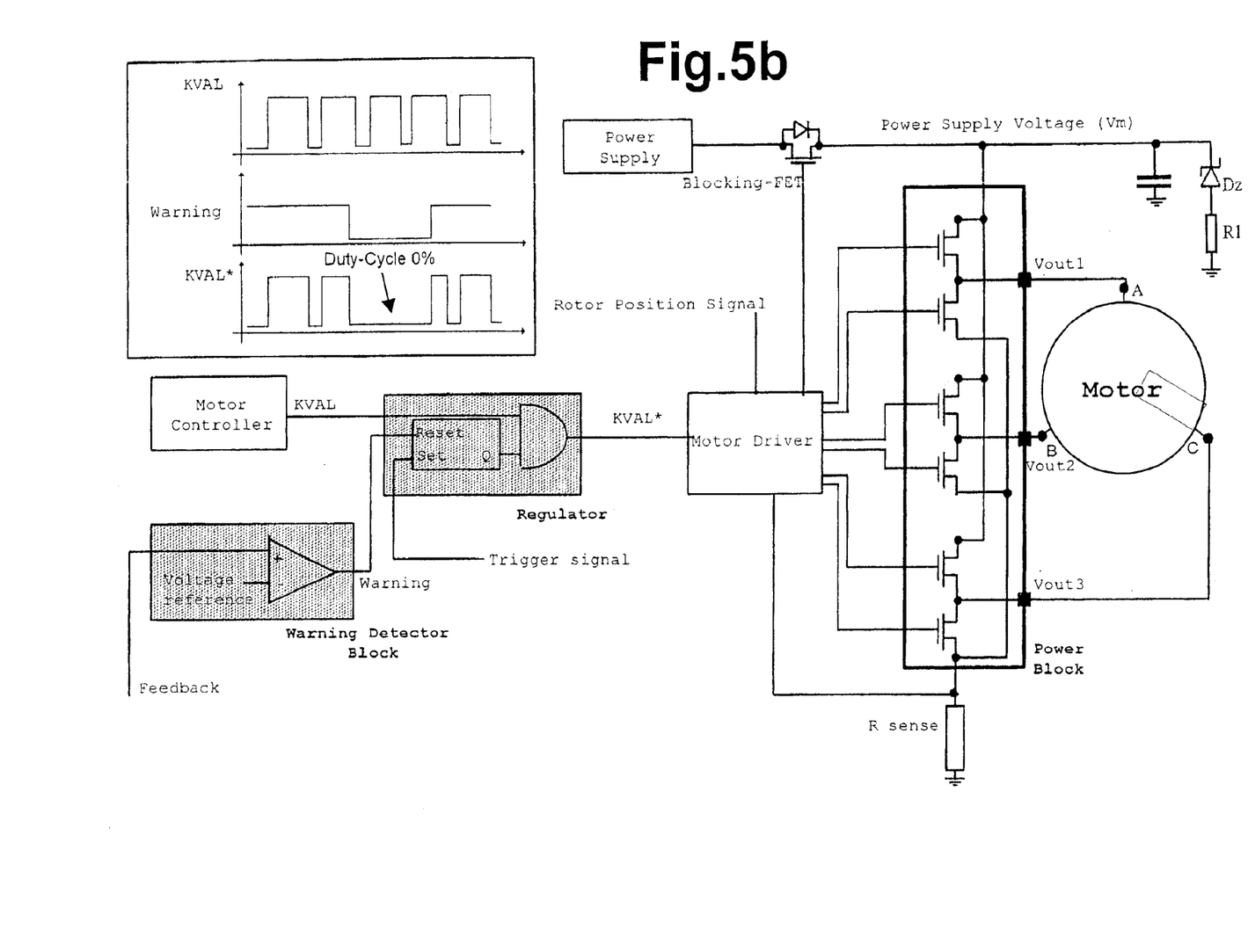
FIG. 5b is another embodiment of the circuit of FIG. 4 for driving the motor in a current mode using PWM signals.

If the control signal KVAL is a PWM signal, its duty cycle determines the mean (effective) voltage that is applied to the phase windings of the motor. Therefore, the windings may be short-circuited by simply nullifying the control signal when the signal WARNING switches to an active state. This can be done by making the regulating circuit REGULATOR output a signal KVAL* corresponding to the logic AND between the signal WARNING and the signal KVAL. Therefore, the driving block MOTOR DRIVER will eventually receive a PWM input signal KVAL* with a null duty cycle, thus practically grounding the windings of the motor.

As shown in FIGS. 5a and 5b, there is a flip-flop SR that, for the same purpose already mentioned above in describing the circuits of FIGS. 3a, 3b and 3c, produces an inverted replica of the signal WARNING that remains in the inactive state for a time equal or longer than a pre-established minimum (i.e., a stretched replica).

The motor drive circuit MOTOR DRIVER of the circuit of FIG. 5b is connected to a sense resistor RSENSE for driving the motor in a current mode, while the circuit of FIG. 5a drives the motor in voltage mode. Should the motor drive circuit MOTOR DRIVER have a current limiter, as it is often the case, it is possible to implement the invention in an extremely straightforward manner by forming the driving circuit depicted in FIG. 6.

As it is often the case with commercially available ICs, integrating both the MOTOR DRIVER and the POWER BLOCK, the motor drive circuit MOTOR DRIVER has a dedicated pin SENSE for monitoring the current circulating in the motor and another pin FORCE for grounding the output power stage. According to this particular embodiment of the invention depicted in FIG. 6, the circuit WARNING DETECTOR BLOCK includes the elements enclosed in the dashed rectangular block. It effectively monitors the voltage on the supply node V$_M$.

Figure 6:
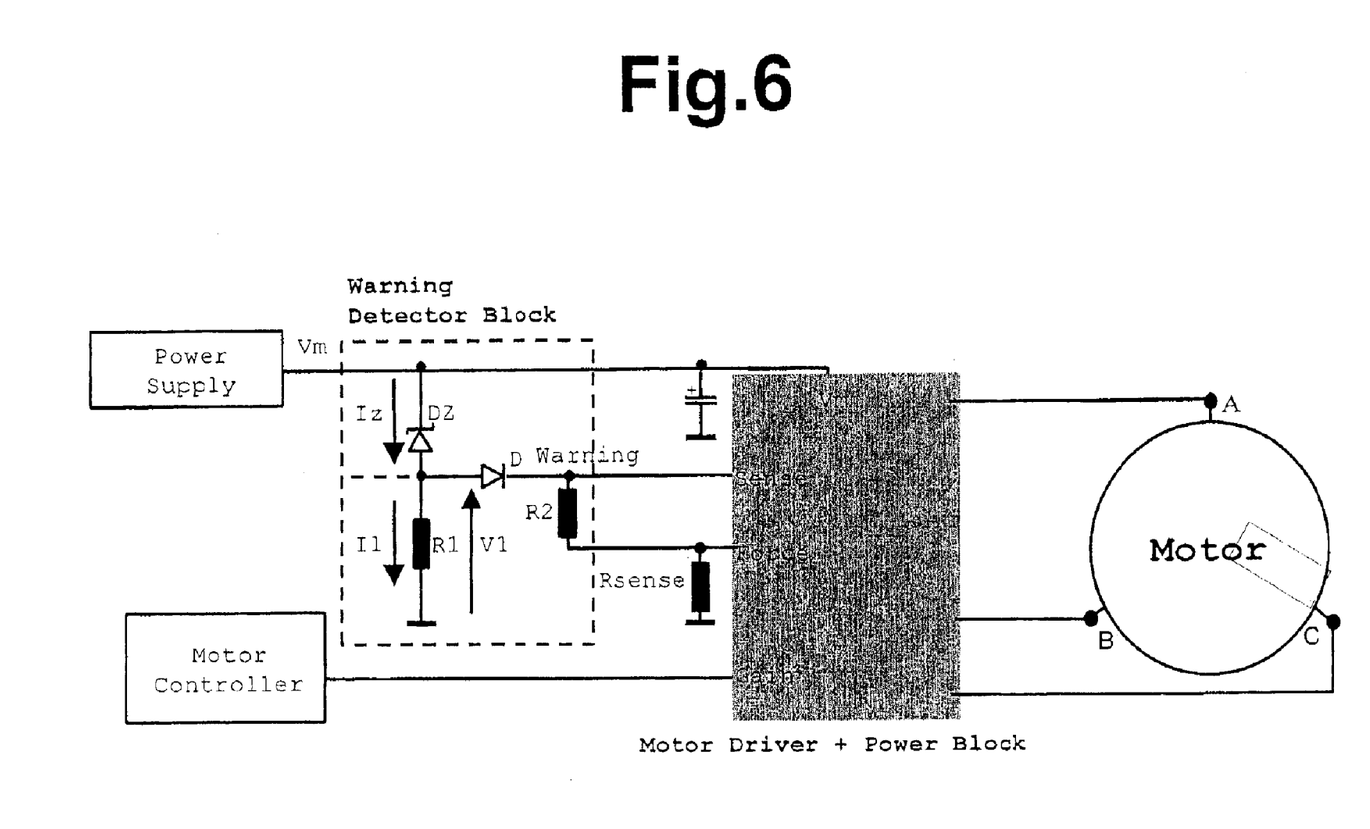
FIG. 6 shows a diagram of another embodiment of the circuit according to the present invention formed by adding a limited number of discrete components.

The logic circuit preventing any substantial inversion of the direction of flow of the current is embodied in the current limiter that is integrated in the motor drive integrated circuit device. According to this embodiment, the circuit WARNING DETECTOR BLOCK exploits the additional discharging path of a filter capacitor for producing an analog warning signal WARNING. When the voltage V$_M$ exceeds a certain threshold, the Zener diode D$_Z$ turns on and a capacitor discharge current I$_Z$ flows through it and through the resistor R1 to ground. If the voltage drop on the resistor R1 becomes sufficiently large to turn on the diode D, there will be a signal WARNING on the pin SENSE, the amplitude of which increases as the voltage V$_M$ increases.

The MOTOR DRIVER circuit in FIG. 6 is represented together with the output power stage POWER BLOCK by the shaded rectangle, and interprets an excessively large WARNING signal on the pin SENSE as if due to an excessive current being forced on the motor windings. When this occurs, the current limiter embodied in the motor drive circuit will set in a high impedance state or short-circuit the windings of the motor.

As a consequence, the filter capacitor will no longer be charged by the motor operating as a current source and shall discharge itself through the diode D$_Z$ and R1 for as long as the Zener remains on.

Differently from known circuits that use power Zener diodes for limiting the amplitude of voltage surges on the filter capacitor, the circuit of FIG. 6 uses a signal Zener diode. According to the present invention, the main function of such a Zener diode D$_Z$ does not include forming a low resistance discharge path of the filter capacitor, but in providing to the MOTOR DRIVER circuit a voltage signal WARNING that increases as an overvoltage on the filter capacitor develops. The circuit of FIG. 6 is more convenient than known circuits in terms of size and cost because it may employ a signal diode instead of a suitably sized power diode.

Figure 7:
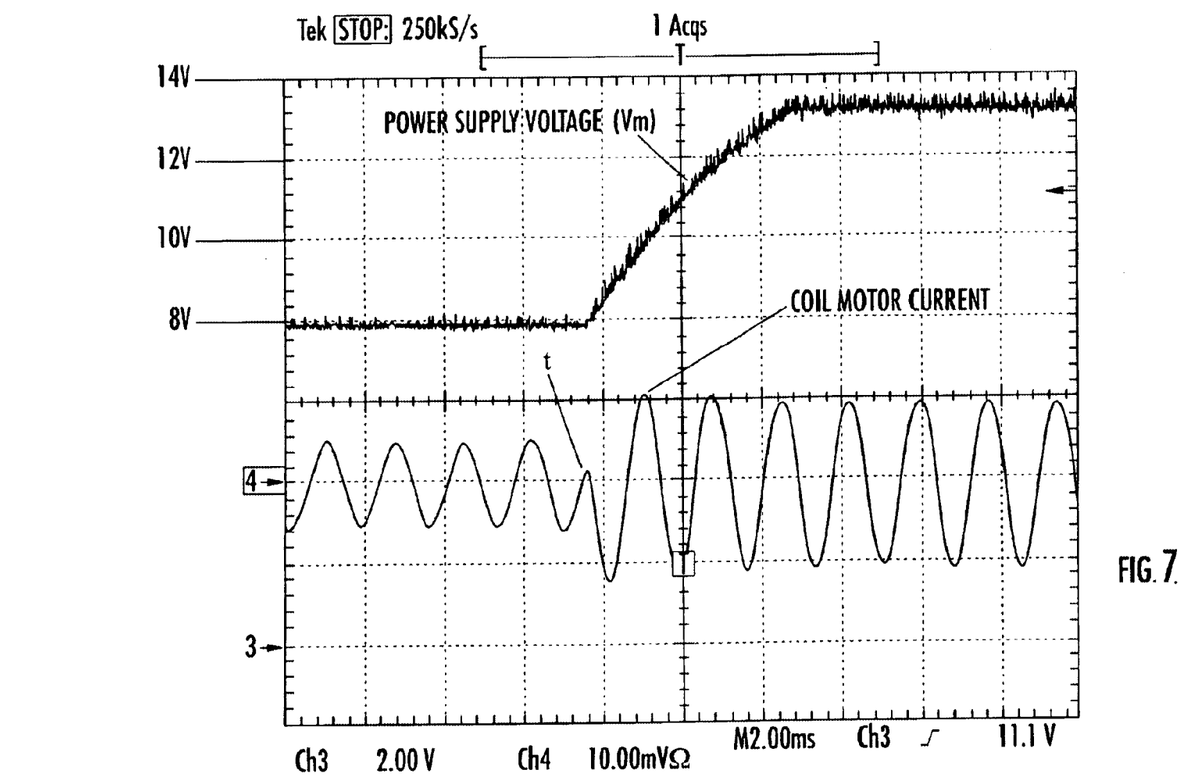
FIG. 7 is a diagram of the main signals during a simulation of the circuit illustrated in FIG. 6.

Diagrams of the voltage V$_M$ and of the current circulating in a phase winding of the motor resulting from a test carried out with the circuit of FIG. 6, are depicted in FIG. 7. As it may be readily observed, the inversion of the phase current at the instant t (that causes also an inversion of the direction of flow of the current on the supply lines) produces a sudden increase of the voltage V$_M$, the surging of which is effectively limited to a prefixed maximum level of 13.5V.

Figure 8:
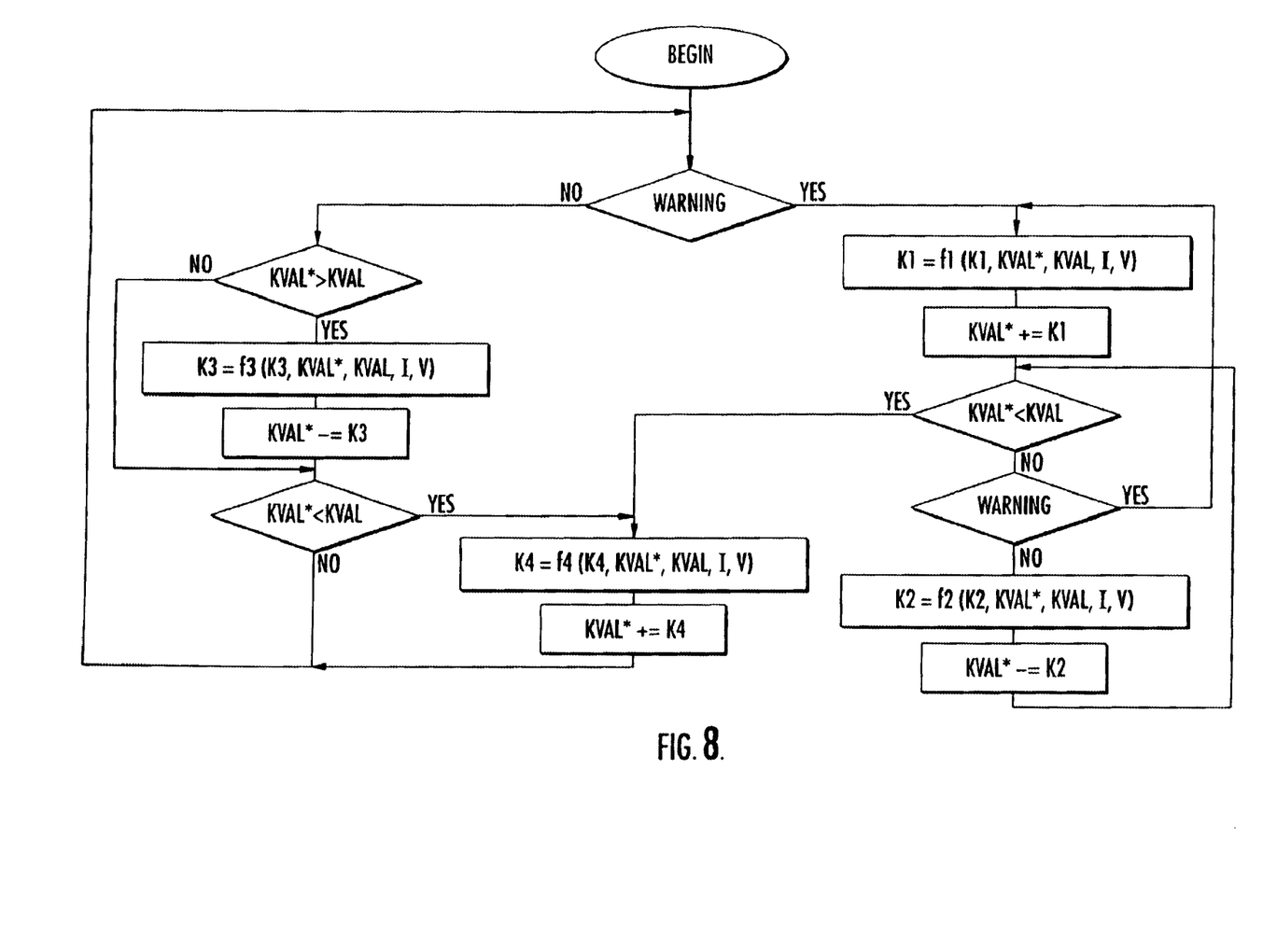
FIG. 8 is a flow chart representation of a preferred embodiment of the method according to the present invention.

A preferred embodiment of the method of the invention, that may be implemented by the driving circuit of FIG. 4, is schematically illustrated by the flow chart of FIG. 8. Essentially, it includes a sequence of steps that run in cycles according to which the signal KVAL* varies at each cycle as a function of the state of the signal WARNING and depending on whether KVAL exceeds KVAL*.

The increment or the decrement of the signal KVAL*, at every cycle, may be constant or may be determined as a function of the operating conditions of the motor. By referring to the embodiment of FIG. 8, possible values of the increments/decrements K1, K2, K3 and K4 are the constant values:

K1=10 K2=5 K3=10 K4=10

Simulations have shown that it is more convenient to choose the value of increments/decrements as a function of the desired and of the real driving conditions of the motor. To reach this objective, different parameters K1, K2, K3 and K4 may be assigned as a function of the difference between the values of the signal KVAL, representative of the desired driving and of KVAL*, that determines the real driving of the motor, as follows:

| | |
|---|---|
| K1 = KVAL − KVAL* | K2 = 1 + (KVAL* − KVAL)/2 |
| K3 = 1 + (KVAL* − KVAL)/2 | K4 = KVAL − KVAL* |

More generally, the increments/decrements should be determined preferably as a function of the voltage present on the supply node of the output power stage, the voltage on the windings and the current fed to the motor KVAL and KVAL*, and the value of the increments/decrements during the preceding cycle, in order to drive the motor in the best possible manner regardless of the operating conditions.

With the method and the circuit according to the present invention as described above, it is possible to drive a DC motor while effectively preventing voltage surges on the supply lines or containing their magnitude within a limit tolerable even by the most sensitive circuits coupled to the same supply rails of the motor.

What is claimed is:

1. A method for preventing generation of voltage surges on a power supply line of a DC motor when operating as a current generator, the DC motor comprising a plurality of windings, the method comprising:
    preventing a direction of current in the power supply line from being substantially inverted when the DC motor is operating as a current generator by setting the plurality of windings to a high impedance state.

2. A method for driving a DC motor comprising a plurality of windings, the method comprising:
    providing a control signal to a motor drive circuit;
    providing respective command signals from the motor drive circuit to a power output stage based upon the control signal, the power output stage being connected to a power supply line and comprising a plurality of switches connected to the plurality of windings; and
    preventing a direction of current flow in the power supply line from being substantially inverted when the DC motor is operating as a current generator.

3. A method according to claim 2, wherein the preventing comprises:
    monitoring at least one operating parameter of the DC motor, the at least one operating parameter comprising at least one of a voltage on a supply node of the power output stage, a voltage on one of the plurality of windings, a direction of the current flow in the power supply line of the power output stage, and a phase difference between current circulating in one of the plurality of windings and a back electromotive force induced on the same winding;
    comparing the at least one monitored operating parameter to a respective threshold; and
    forcing on each winding a voltage to prevent the direction of the current in the power supply line from being substantially inverted when the at least one monitored operating parameter exceeds its respective threshold.

4. A method according to claim 3, wherein the DC motor comprises a regulating circuit connected to the motor drive circuit, the regulating circuit receiving the control signal and providing a modified control signal to the motor drive circuit; and wherein the preventing is performed based upon the modified control signal.

5. A method according to claim 2, wherein the preventing comprises short-circuiting the plurality of windings.

6. A method according to claim 2, wherein the preventing comprises setting the windings to a high impedance state.

7. A method according to claim 4, wherein if the monitored operating parameters do not exceed the respective thresholds, then
   decrementing the modified control signal by a first amount if the modified control signal is greater than the control signal;
   incrementing the modified control signal by a second amount if the modified control signal is less than the control signal; and
   if the modified control signal is equal to the control signal, then starting a new cycle of monitoring the at least one operating parameter.

8. A method according to claim 7, wherein if the at least one monitored operating parameter exceeds the respective threshold, then incrementing the modified control signal by a third amount; wherein if the control signal is greater than the modified control signal, then incrementing the modified control signal by the second amount and starting a new cycle of monitoring the operating parameters; and wherein if the control signal is less than the modified control signal, then starting a new cycle of monitoring the operating parameters.

9. A method according to claim 8, further comprising incrementing the modified control signal by the second amount if one of the operating parameters exceeds the respective threshold in the new cycle; and decrementing the modified control signal by a fourth amount if one of the operating parameters does not exceed the respective threshold in the new cycle; and starting a new cycle of determining if the control signal is greater than the modified control signal.

10. A method according to claim 9, wherein the first, second, third and fourth amounts are determined at each cycle based upon a voltage on a winding, current circulating in the DC motor, the modified control signal, the control signal and the respective first, second, third and fourth amounts of a preceding cycle.

11. A driving circuit for a DC motor comprising a plurality of windings, the driving circuit comprising:
    a power output stage connected to a power supply line and comprising a plurality of switches connected to the windings;
    a logic circuit connected to said power output stage for preventing a direction of current flow in the power supply line from being substantially inverted when the DC motor is operating as a current generator;
    a motor drive circuit connected to said logic circuit for providing respective command signals to said plurality of switches; and
    a control circuit connected to said motor drive circuit for providing a control signal thereto.

12. A driving circuit according to claim 11, further comprising a filter capacitor connected to the power supply line; and wherein said power output stage is connected in parallel to the filter capacitor.

13. A driving circuit according to claim 11, further comprising:
    a warning detector circuit having a first input for receiving a threshold reference, and a second input for receiving at least one operating parameter of the DC motor, and an output for providing a warning signal to said logic circuit when the threshold reference is exceeded by the at least one operating parameter;
    the at least one operating parameter comprising at least one of a voltage on a supply node of said power output power stage, a voltage on one of the plurality of windings, the direction of the current flow in the power supply line, and a phase difference between current circulating in one of the plurality of windings and a back electromotive force induced on the same winding.

14. A driving circuit according to claim 12, further comprising a discharge path connected in parallel to the filter capacitor, the discharge path comprising a switch and a resistor connected in series with said switch, said switch being turned on when a voltage on a supply node of said power output stage exceeds a predetermined value.

15. A driving circuit according claim 14, wherein said switch comprises a Zener diode.

16. A driving circuit according to claim 13, wherein said warning detector circuit comprises a voltage comparator.

17. A driving circuit according to claim 13, wherein said motor drive circuit is coupled to said plurality of switches through said logic circuit; wherein said plurality of switches comprise a first set of switches and a second set of switches connected together; and wherein said logic circuit comprises:
    an array of logic AND gates connected to said first set of switches for coupling the plurality of windings to the power supply line, each logic AND gate having a first input for receiving a respective command signal and a second input for receiving an inverted replica of the warning signal that remains in an inactive state longer than a predetermined time; and
    an array of logic OR gates connected to said second set of switches for coupling the plurality of windings to a voltage reference, each logic OR gate having a first input for receiving a respective command signal and a second input for receiving an inverted logic signal of the inverted replica of the warning signal.

18. A driving circuit according to claim 13, wherein said motor drive circuit is coupled to said plurality of switches through said logic circuit; wherein said plurality of switches comprise a first set of switches and a second set of switches connected together; and wherein said logic circuit comprises:
    an array of logic AND gates connected to said first set of switches for coupling the plurality of windings to a voltage reference, each logic AND gate having a first input for receiving a respective command signal and a second input for receiving an inverted replica of the warning signal that remains in an inactive state longer than a pre-established minimum time; and
    an array of logic OR gates connected to said second set of switches for coupling the plurality of windings to the power supply line, each logic OR gate having a first input for receiving a respective command signal and a second input for receiving an inverted logic signal of the inverted replica of the warning signal.

19. A driving circuit according to claim 13, wherein said motor drive circuit is coupled to said plurality of switches through said logic circuit; and wherein said logic circuit comprises an array of logic AND gates connected to said plurality of switches, each logic AND gate having a first input for receiving a respective command signal and a second input for receiving an inverted replica of the warning signal that remains in an inactive state longer than a pre-established minimum time.

20. A driving circuit for a DC motor comprising a plurality of windings, the driving circuit comprising:
   a power output stage connected to a power supply line and comprising a plurality of switches connected to the windings;
   a motor drive circuit connected to said power output stage for providing respective command signals to said plurality of switches;
   a control circuit for providing a control signal; and
   a regulating circuit having an input for receiving the control signal and an output for providing a modified control signal to said motor drive circuit for preventing a direction of current flow in the power supply line from being substantially inverted when the DC motor is operating as a current generator.

21. A driving circuit according to claim 20, wherein a filter capacitor is connected to the power supply line; and wherein said power output stage is connected in parallel to the filter capacitor.

22. A driving circuit according to claim 20, further comprising:
   a warning detector circuit having a first input for receiving a threshold reference, a second input for receiving at least one operating parameter of the DC motor, and an output for providing a warning signal to said regulating circuit when the threshold reference is exceeded by at least one of the operating parameters;
   the at least one operating parameter comprising at least one of a voltage on a supply node of said power output power stage, a voltage on one of the plurality of windings, the direction of the current flow in the power supply line, and a phase difference between current circulating in one of the plurality of windings and a back electromotive force induced on the same winding.

23. A driving circuit according to claim 21, further comprising a discharge path connected in parallel to the filter capacitor, the discharge path comprising a switch and a resistor connected in series with said switch, said switch being turned on when a voltage on a supply node of said power output stage exceeds a maximum value.

24. A driving circuit according claim 23, wherein said switch comprises a Zener diode.

25. A driving circuit according to claim 22, wherein said warning detector circuit comprises a voltage comparator.

26. A driving circuit according to claim 23, wherein the discharge path is within said warning detector circuit; and wherein said regulating circuit limits current being applied to the plurality of windings when a voltage drop on said resistor exceeds a threshold.

27. A driving circuit according to claim 22, wherein the modified control signal is a function of the control signal and the warning signal.

28. A driving circuit according to claim 27, wherein the modified control signal and the control signal are PWM signals; and wherein said regulating circuit comprises a logic AND gate having a first input for receiving the control signal, and a second input for receiving an inverted replica of the warning signal that remains in an inactive state longer than a pre-established minimum time.

* * * * *